H. B. McCOOL.
Egg Beater.

No. 232,358.  Patented Sept. 21, 1880.

ATTEST:
Thomas A. Davis.
Harry R. Foster.

INVENTOR:
Horace B. McCool

UNITED STATES PATENT OFFICE.

HORACE B. McCOOL, OF POTTSVILLE, PENNSYLVANIA.

EGG-BEATER.

SPECIFICATION forming part of Letters Patent No. 232,358, dated September 21, 1880.

Application filed February 27, 1880.

*To all whom it may concern:*

Be it known that I, HORACE B. McCOOL, of Pottsville, Schuylkill county, Pennsylvania, have invented a new and useful Egg-Beater, of which the following is a specification.

My invention relates to improvements in machines for beating eggs; and the object of my improvement is to provide an egg-beater that will expeditiously and thoroughly separate a mass of unbeaten eggs into minute particles and produce a light aerated mass in its stead.

I attain my object by mechanism illustrated in the accompanying drawings, in which similar letters of reference indicate like parts, and in which—

Figure 1:
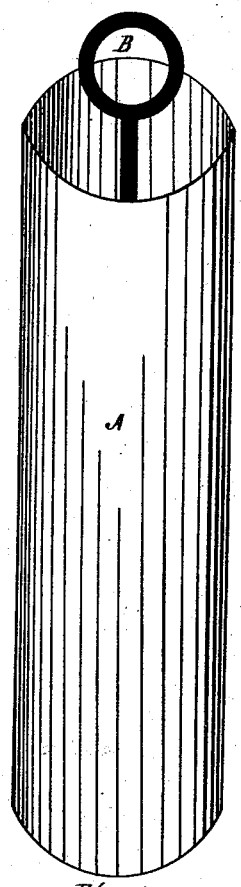
Figure 3:
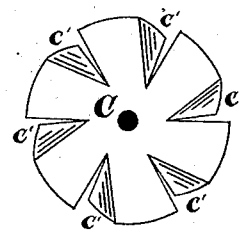
Figure 2:
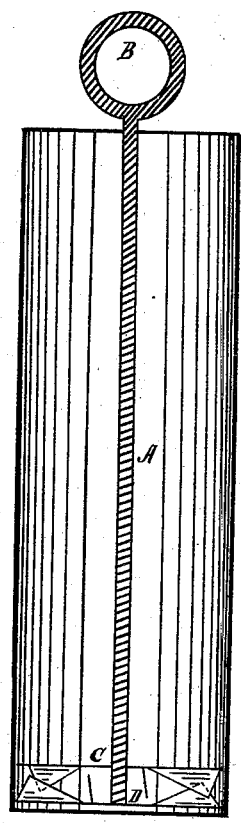

Figure 1 is a full view of my invention; Fig. 2 a sectional view of the same, and Fig. 3 a top view of one of the disks belonging to the dasher.

A is a cylindrical vessel; B, the stem of the dasher, and C and D are disks forming the dasher proper. On one end of the stem B, I form a loop or ring, which serves for a handle for convenience in operating the dasher, and I make it of suitable wire or a metallic rod.

The disks C and D (shown fully in Fig. 3) are formed of sheet metal, having lips or projections $c'$ $c'$ $c'$ $c'$ $c'$ $c'$ thereon, formed so as to project below the top surface. The number of these lips or projections can be increased or diminished, as may be desired. Two of these disks are secured to the stem B, as shown in Fig. 2, the lips or projections being arranged so as not to touch each other, but being placed between the top and bottom surfaces of the dasher which they form.

To operate the beater, the eggs are placed in the cylindrical vessel and the dasher is moved briskly up and down. The eggs will be forced through the openings made in the disks by the formation of the lips, and in passing the edges of these lips the mass of eggs will be thoroughly broken up and separated.

The peculiar formation of the disks gives the mass a rotary or churning motion independent of the motion given by simply moving the dasher up and down. Every movement of the dasher produces suction, and by this means air is distributed throughout the particles of the eggs and thoroughly aerates them.

I prefer to secure the disks rigidly to the stem B, although they work well if allowed to revolve.

I am aware that egg-beaters have been made with dashers operating in cylindrical vessels, and therefore I do not claim the use of dasher and cylindrical vessel, broadly; but What I do claim, and desire to secure by Letters Patent, is—

The combination, in an egg-beater, of the cylindrical vessel A and dasher composed of stem B and disks C and D, having lips or projections $c'$ $c'$ $c'$ $c'$ $c'$ $c'$, all substantially as shown and set forth.

HORACE B. McCOOL.

Witnesses:
B. BRYSON McCOOL,
JAMES B. REILLY.